United States Patent [19]
Paneth et al.

[11] Patent Number: 5,627,885
[45] Date of Patent: May 6, 1997

[54] SYSTEM FOR, AND METHOD OF, TRANSMITTING AND RECEIVING THROUGH TELEPHONE LINES SIGNALS REPRESENTING DATA

[75] Inventors: Eric Paneth, Givatayim; Mordechai Segal, Herzelia; Boaz Rippin; Ehud H. Rokach, both of Tel-Aviv, all of Israel

[73] Assignee: Brooktree Corporation, San Diego, Calif.

[21] Appl. No.: 195,628

[22] Filed: Feb. 14, 1994

[51] Int. Cl.$^6$ .................................................. H04M 11/00
[52] U.S. Cl. ........................... 379/93; 379/98; 375/367
[58] Field of Search .................. 379/98, 93, 97, 379/96; 375/222, 367; 370/107

[56] References Cited

U.S. PATENT DOCUMENTS

| | | | |
|---|---|---|---|
| 5,200,976 | 4/1993 | Ishihara et al. | 375/222 |
| 5,226,060 | 7/1993 | Goodson et al. | 375/222 |
| 5,278,865 | 1/1994 | Amrany et al. | 375/222 |
| 5,337,332 | 8/1994 | Yaguchi et al. | 375/367 |
| 5,353,280 | 10/1994 | Ungerböck | 375/121 |

*Primary Examiner*—Stella Woo
*Attorney, Agent, or Firm*—Ellsworth R. Roston; Charles H. Schwartz

[57] ABSTRACT

Analog signals representing individual digital values (±1, ±3) pass through a telephone line to a receiver. These signals may be first provided in a pseudo random sequence. A linear echo canceller and a first adder eliminate, to an extent, echo signals resulting from second analog signals transmitted on the same telephone line by the receiver. A non-linear echo canceller and a second adder further reduce the echo signals and specifically reduce non-linear components in the echo signals. Adjustable signal delays achieve optimal performance of the linear and non-linear echo cancellers. An equalizer containing four (4) different modules then compensates for signal distortions introduced by the telephone line and minimizes the effect of noise in the telephone line. The equalizer modules are a digital gain control element, a feed forward digital filter and two (2) feedback digital filters. A detector module produces in one of several different ways at the receiver an estimate of the digital data (±1, ±3) transmitted at the other end of the telephone line. The detector either extracts the digital information based on peaks in the received (non-equalized) signal or by adding the equalized signals with preset threshold values. A scrambler-descrambler module locally generates a replica of the digital symbols transmitted in analog form at the other end of the telephone line, based on a limited number (e.g. 23) of correctly detected digital values. The scrambler-descrambler module may also operate as a descrambler to recover data scrambled by the transmitter at the other end.

45 Claims, 5 Drawing Sheets

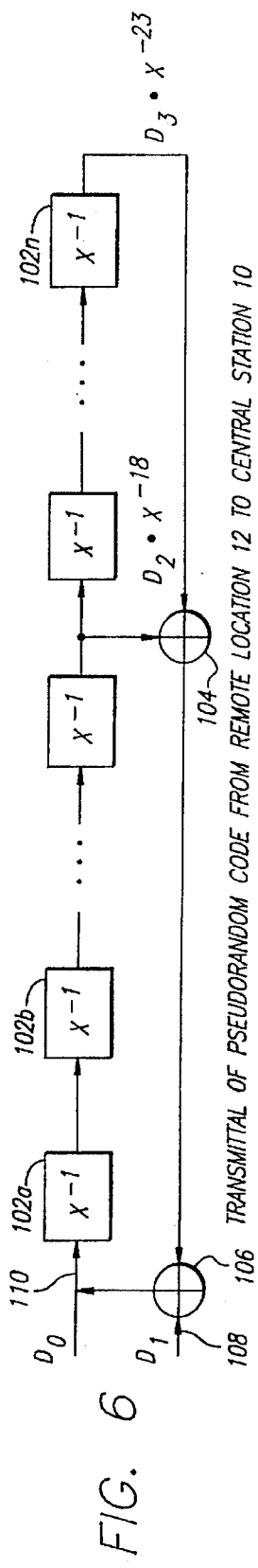
FIG. 6 TRANSMITTAL OF PSEUDORANDOM CODE FROM REMOTE LOCATION 12 TO CENTRAL STATION 10
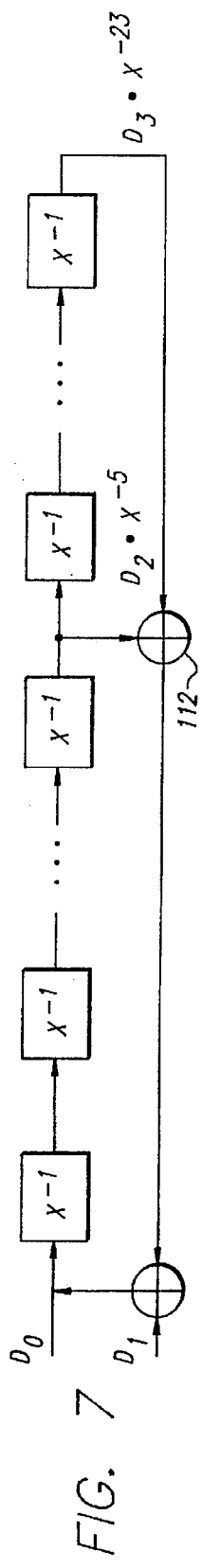
FIG. 7 TRANSMITTAL OF PSEUDORANDOM CODE FROM CENTRAL STATION 10 TO REMOTE LOCATION 12
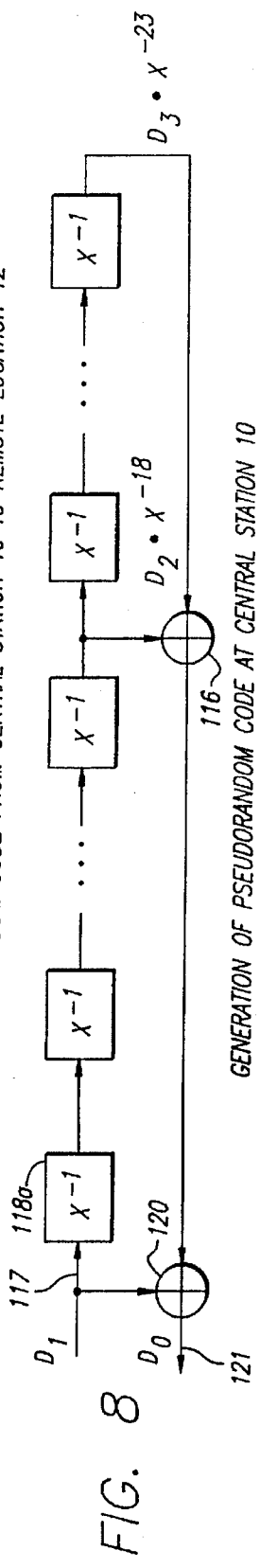
FIG. 8 GENERATION OF PSEUDORANDOM CODE AT CENTRAL STATION 10
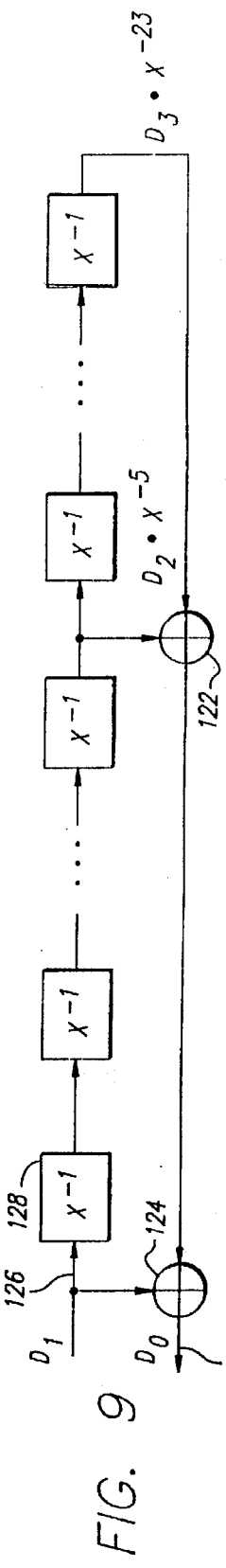
FIG. 9 GENERATION OF PSEUDORANDOM CODE AT REMOTE LOCATION 12 DETAILED BLOCK DIAGRAM CONSTRUCTION OF SCRAMBLER – DESCRAMBLER REGISTER/90 IN FIGURE 5

SYSTEM FOR, AND METHOD OF, TRANSMITTING AND RECEIVING THROUGH TELEPHONE LINES SIGNALS REPRESENTING DATA

This invention relates to systems for, and methods of, passing digital data at high rates in analog form through copper telephone lines between a central station and subscribers serviced by the central station and recovering the data at the receiving end of the telephone lines. This invention further relates to systems for, and methods of, providing for such transmission and reception without any repeaters in the telephone lines.

Telephone systems are organized on a systematic basis. A central station is provided to service all of the subscribers within a particular radius such as approximately one (1) mile from the central station. When a subscriber serviced by the central station wishes to make a telephone call, he dials a sequence of numbers identifying the party called. Signals representing this sequence of numbers then pass through the telephone lines from the caller to the central station. The sequence of dialed numbers are then transmitted from the central station through other telephone lines to the central station of the party being called. This central station then channels the call to the telephone of the party being called.

Telephone systems have been partially upgraded in recent years. For example, optical fibers have largely replaced copper telephone lines between the central station servicing the telephone of the calling party and the central station of the party being called. This is particularly true when the call being made is a long distance call. Optical fibers are advantageous because they can transmit signals at high frequencies with minimal losses in power and minimal degradation in system fidelity. Optical fibers are also advantageous because they can handle a large number of different calls simultaneously without any interference between the calls.

Even though optical fibers are generally now used between different central stations, copper wires are still generally used between the central stations and the subscribers serviced by such central stations. Copper wires have inherent disadvantages. They provide relatively large power losses, particularly in relation to optical fibers. This causes the fidelity of the signals to be degraded as the signals pass through the copper telephone lines. Copper lines also provide interference between different calls travelling through adjacent copper wires. Because of these negative factors involved in the use of copper wires in telephone systems, it would be desirable to replace the copper wires with optical fibers as quickly as possible. However, this is a monumental task, particularly in view of the large number of subscribers. At the present time, it is contemplated that optical fibers will not completely replace the copper wires until well into the twenty first (21st) century.

Because of the power losses and the degradation in signal fidelity in the copper wires, repeaters have had to be disposed at spaced intervals between the central station and the subscriber. The repeaters boost the signals after they have deteriorated while passing through the telephone lines. As many as two (2) or three (3) repeaters have often had to be provided between the central station and the subscriber. Repeaters are disadvantageous. They consume power and require space. Furthermore, in order to operate properly, they often are disposed below the ground (as in manholes) at displaced positions between the central station and the subscriber. The position of a repeater previously disposed below the ground for boosting the signals between the central station and a particular subscriber is often difficult to locate, particularly since the copper lines between the central station and the particular subscriber first have to be located and these lines are often disposed below ground.

The need for installing repeaters between the central station and the subscribers serviced by the central station has become magnified in recent years. This has resulted from the fact that data signals as well as voice signals have been transmitted through the copper lines in recent years. Data signals occur at higher data rates than voice signals. This has caused the power losses in the copper lines and the distortions in the fidelity of the signals transmitted through the copper lines to become magnified. Furthermore, data signals illustratively transmitted from a central station to a subscriber are reflected at the subscriber's location back to the central station. These signals interfere at the central station with the data signals transmitted from the subscriber's location to the central station and prevent the data signals from being decoded clearly. The clear decoding of data is important because errors in data are not as easily tolerated as errors in sound. For example, an error in the transmission of data representing numerical values can become considerably compounded as numerical computations involving such error progress.

In one embodiment of the invention, analog signals representing individual digital values ($\pm 1$, $\pm 3$) pass through a telephone line to a receiver. These signals may be first provided in a pseudo random sequence. A linear echo canceller and a first adder eliminate, to an extent, echo signals resulting from second analog signals transmitted on the same telephone line by the receiver. A non-linear echo canceller and a second adder further eliminate the echo signals and specifically reduce non-linear components in the echo signals. Adjustable signal delays achieve optimal performance of the linear and non-linear echo cancellers.

An equalizer containing four (4) different modules then compensates for signal distortions introduced by the telephone line and minimizes the effect of noise present in the telephone line. The equalizer modules are a digital gain control element, a feed forward digital filter, and two (2) feedback digital filters.

A detector module produces in one of several different ways at the receiver an estimate of the digital data ($\pm 1$, $\pm 3$) transmitted at the other end of the telephone line. The detector either extracts the digital information based on peaks in the received (non-equalized) signal, or by adding the equalized signal with preset threshold values.

A scrambler-descrambler module locally generates a replica of the digital symbols transmitted in analog form at the other end of the telephone line, based on a limited number (e.g. 23) of correctly detected digital values. The scrambler-descrambler module may also operate as a descrambler to recover data scrambled by the transmitter at the other end.

In the drawings:

FIG. 6 is a circuit diagram in block form of a system included at the subscriber location for generating digital signals in a pseudo random code for transmission in analog form to the central station when the system shown in FIG. 5 is being used at the central station;

FIG. 7 is a circuit diagram in block form of a system included at the central station for generating digital signals in a pseudo random code for transmission in analog form to the subscriber location when the system shown in FIG. 5 is being used at the subscriber location;

FIG. 8 is a circuit diagram in block form of a system included at the central station for generating digital signals in a pseudo random code station when the system shown in FIG. 5 is being used to transmit data signals from the subscriber location to the central station;

FIG. 9 is a circuit diagram in block form of a system included at the subscriber location for generating digital signals in a pseudo random code when the system shown in FIG. 5 is being used to transmit data signals from the central station to the subscriber location.

Figure 1:
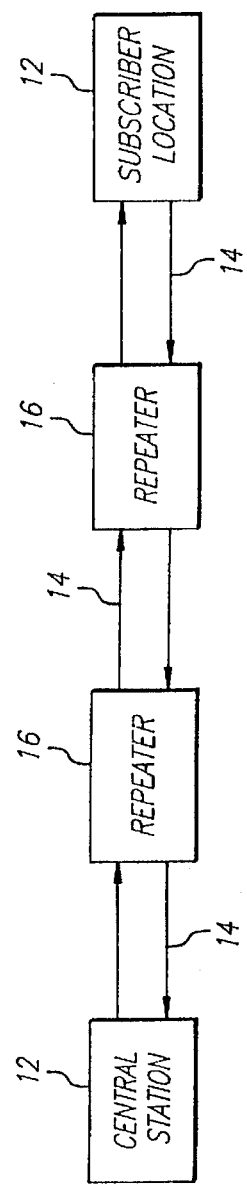
FIG. 1 is a simplified block diagram of a system of the prior art for transmitting analog signals representing digital data signals through copper lines between an individual one of a central station and a subscriber location and for receiving and decoding the analog signals at the other one of the central station and the subscriber location.

FIG. 1 illustrates a system now in use for transmitting aural (e.g. voice) signals and data signals between a central station 10 and a subscriber's location 12. The central station 10 is able to communicate with all of the subscribers, including the subscriber 12, within a particular radius such as approximately one (1) mile from the central station. The communication generally occurs through copper lines 14. These copper lines have often been in place for many years. They have effectively transmitted voice signals between the central station 10 and the subscriber 12 but with power losses and some signal distortion.

The system shown in FIG. 1 has been relatively effective because voice signals occur at relatively low frequencies—generally to a maximum of about three thousand hertz (3 Khz). Furthermore, if there has been an occasional distortion in the signals transmitted through the copper lines, this occasional distortion has not affected the ability of the person at the receiving end to hear and understand the audio message. In other words, the subscriber is often willing to overlook minor and instantaneous distortions in the audio information that he or she receives as long as the audio information is understandable and does not appear aurally to be distorted.

In recent years, data has been transmitted through the copper lines 14 between the central station and the subscriber. This data has been transmitted through the copper lines 14 in analog form at data rates significantly higher than the frequencies of the audio information transmitted through the telephone lines. Such data has had to be received by the subscriber with considerable accuracy. For example, if the data represents numerical information, an error in the reception of such numerical information may cause subsequent numerical information derived from the numerical information with the error to be inaccurate. Sometimes an error in the reception of numerical information may even become compounded by subsequent calculations involving such numerical information that the error becomes enormous.

Since the data transmitted through the copper lines is at relatively high frequencies, the power losses in the copper lines 14 increase and the distortions produced in the transmission of the data through the telephone lines also increase. To compensate for these difficulties, receivers 16 have been provided in the copper lines 14 at spaced intervals between the central station 10 and the subscriber 12. The repeaters 16 may be considered as amplifiers which restore power to the data signals and restore the high frequency components to such signals. Generally one (1) to three (3) repeaters 16 are disposed in the copper lines 14 between the central station 10 and the subscriber 12.

It has been recognized for some time that the disposition of the repeaters 16 in the copper lines 14 between the central station 12 and the subscriber 12 is not the ultimate solution to the problems discussed above. Repeaters are expensive. They also consume power. Furthermore, they provide a fair, but far from perfect, restoration of the characteristics of the signals in the lines 14. They are also disposed below ground. Because of this, it is often difficult to locate the copper lines 14 of the individual subscriber 12 and to connect one or more of the repeaters 16 in these copper lines.

Recently a system has been provided by Pairgain Technologies for operating on the data signals passing through the copper lines 14 so that the data information is transmitted with fidelity between the central station 10 and the subscriber location 12. Because of this, repeaters 16 do not have to be provided in the copper lines 14 between the central station 10 and the subscriber location 12. This system has quickly achieved considerable recognition. Units of this system are being sold in large quantities to the regional telephone companies and to other customers.

This invention provides a different system than that of Pairgain for accomplishing substantially the same results. The system of this invention is at least the equal of the system provided by Pairgain Technologies. For example, the error rate in the transmission of data signals through the copper lines 14 in this system is no greater than, and may be slightly less than, the error rate in the transmission of such data signals by the system of Pairgain Technologies. Furthermore, repeaters 16 do not have to be provided in the copper lines 14 between the central station 10 and the subscriber location 12 when the system of this invention is provided at the central station 10 and the subscriber location 12.

Figure 2:
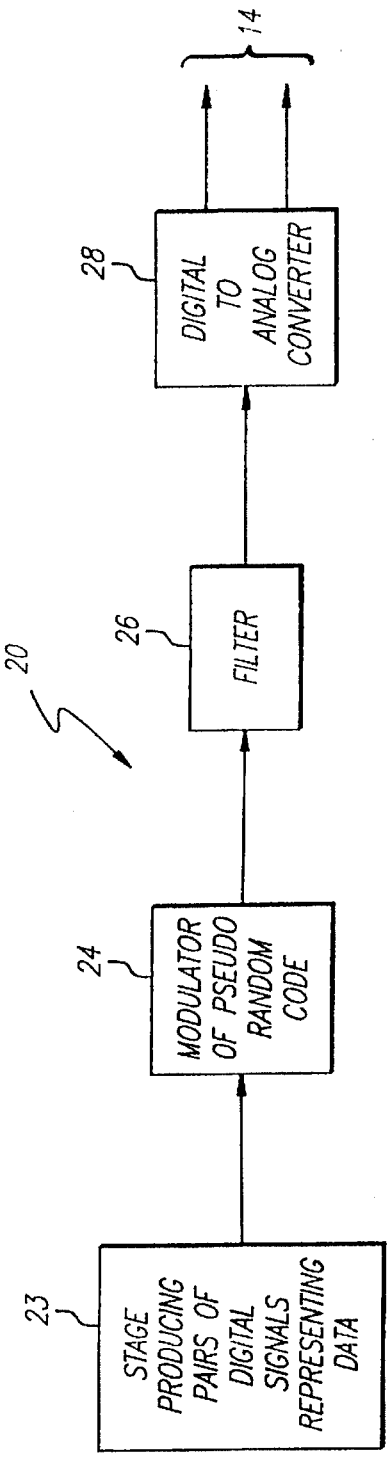
FIG. 2 is a simplified block diagram of a transmitter disposed at the individual one of the central station and the subscriber location and included in one embodiment of the invention for transmitting analog signals representing digital data through copper lines to the other one of the central station and the subscriber location.
Figure 3:
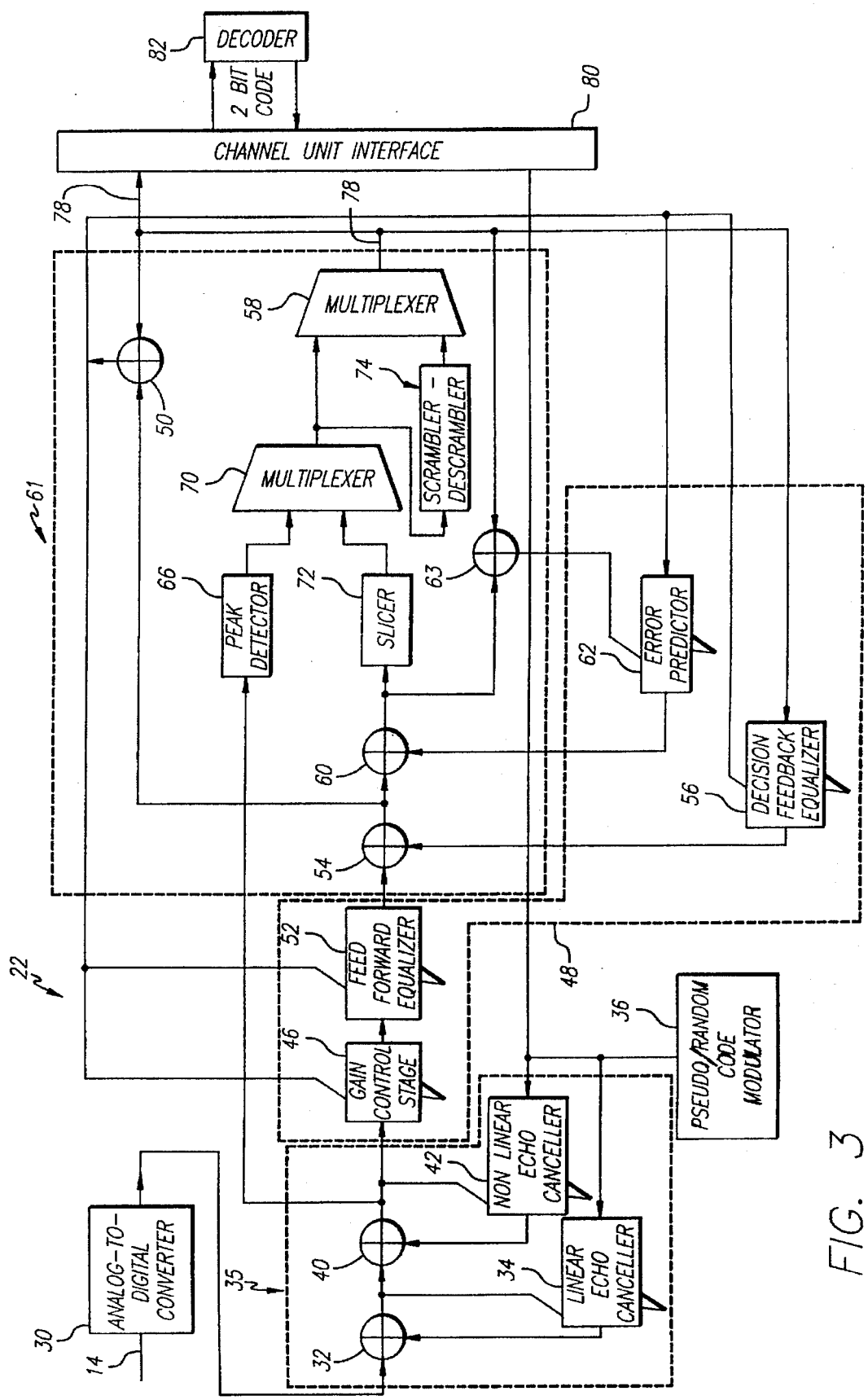
FIG. 3 is a simplified block diagram of a receiver disposed at the other one of the central station and the subscriber location and included in one embodiment of the invention.

In one embodiment of the invention, a transmitter generally indicated at 20 in FIG. 2 and a receiver generally indicated at 22 in FIG. 3 are disposed in a composite housing at each of the central station 10 and the subscriber location 12. Generally the transmitter 20 and the receiver 22 are disposed in a common housing. However, the transmitter 20 and the receiver 22 are shown in separate Figures for purposes of clarity. The transmitter 20 includes a stage 23 which provides data signals having four (4) analog levels representing data values of +3,+1,−1 and −3. Each of the four (4) analog levels represents a pair of digital signals having a coded pattern individual to such analog level. This may be seen from the following table.

| Analog Value | Pattern of digital signals |
| --- | --- |
| +3 | 10 |
| +1 | 11 |
| −1 | 01 |
| −3 | 00 |

The digital data produced in the stage 23 to represent an individual sequence of analog values is combined as at 24 with digital signals in a pseudo random pattern of binary 1's and 0's. This pseudo random pattern is individual to the particular transmitter. For example, the transmitter 20 at the central 10 may provide a different pseudo random code than the transmitter at the subscriber location 12. The resultant digital signals may be filtered as at 26 to pass signals only in a particular range of frequencies within the transmission capabilities of the copper lines 14. The filtered signals are converted by a digital-to-analog converter 28 to corresponding analog signals and the analog signals are transmitted through the copper lines 14. The transmitter 20 described above and shown in FIG. 2 is well known in the art. However, it is novel when combined in a system with the receiver 22 shown in FIG. 3.

The receiver 22 shown in FIG. 3 may be considered to be included in one embodiment of the invention. The receiver 22 receives the analog data signals (digitally combined with the pseudo random code) passing through the copper lines 14 from the transmitter 20. These signals are converted by an analog-to-digital converter 30 to corresponding digital signals. The digital signals are introduced to an adder or summing device 32 which compares the digital signals from the converter 30 with digital signals from a linear echo canceller 34. The linear echo canceller 34 in turn receives signals in a pseudo random code from a stage 36. The adder or summing device 32 and the linear echo canceller 34 are included in stages generally indicated at 35 for eliminating echoes from the signals received by the receiver 22. The stages 35 are enclosed within a box in broken lines.

Assume that the transmitter 20 in FIG. 2 is at the central station 10 and that the receiver 22 in FIG. 3 is at the subscriber location 12. As previously described, the pseudo random code at the central station 10 is individual to the central station and the pseudo random code at the subscriber location 12 is individual to the subscriber location. The pseudo random code at the subscriber location is combined with the digital signals representing digital data transmitted from the subscriber location 12 to the central station 10. These combined digital signals are reflected with some intensity by the transmitter 20 at the central station 10 and the reflected or echo signals are received at the receiver 22 at the subscriber location 12. Thus the digital signals received at the receiver 22 are a mixture of the digital signals (combined with a first code) transmitted from the transmitter 20 at the central station 12 and digital signals (modulated in a second pseudo random code) transmitted from the subscriber location. The digital signals combined with the second pseudo random code are transmitted in analog form from the subscriber location 12 to the central station 10 and are reflected by the central station back to the subscriber location.

The linear echo canceller 34 co-operates with the adder 32 to eliminate on a coarse basis the echo or reflected signals combined with the second pseudo random code. The adder 32 removes the reflected or echo signals by simultaneously adding or subtracting a sequence of approximately one hundred and twenty eight (128) digital signals from the converter 30 and the linear echo canceller 34. The resultant signals at the output of the adder 32 are introduced back to the linear echo canceller 34 to change the coefficients at one hundred twenty (120) progressive taps in the linear echo canceller.

By continuously adjusting the coefficients at the different taps in the linear echo canceller 34 in accordance with the results of the comparison in the adder or summing device 32, the linear echo canceller 34 has an optimal effect in removing any echoes or reflections from the digital signals provided by the converter. The continuous adjustments in the coefficients of the linear echo canceller 34 are indicated by a line (partially broken) at the top and bottom of the rectangle indicating the linear echo canceller. Such line extends from the output of the adder 32 diagonally through the box designated as the linear echo canceller 34 and terminate with a downwardly pointing arrow at a position just below such box. Similar arrangements are shown in other stages where continuous adjustments in coefficients are being made.

Linear echo cancellers are known in the prior art. However, the system of this invention incorporates a novel linear echo canceller which is simplified relative to, but provides comparable performance relative to, the linear echo cancellers known in the prior art. This novel linear echo canceller is disclosed and claimed in a patent application Ser. No. 08/195,267, now U.S. Pat. No. 5,500,892, filed in the United States Patent Office on Feb. 14, 1994 in the name of Daniel L. Essig as a sole inventor and with the title of Echo Canceller. Such application has been assigned of record to the assignee of record of this application. The specification and drawings of application Ser. No. 08/195,267 are incorporated by reference in this application if such specification and drawings are necessary or desirable to complete the disclosure in this application.

The signals from the adder 32 are introduced to another adder or summing device 40 which also receives digital signals from a non-linear echo canceller 42. The inclusion of the non-linear echo canceller 42 constitutes one of the key features of this invention. The adder or summing device 40 and the non-linear echo canceller 42 are included in the stages indicated in broken lines at 35 in FIG. 3. The non-linear echo canceller 42 receives the signals from the modulator 36 in the same pseudo random code as the linear echo canceller 34. However, the non-linear echo canceller 42 has only a minimal number of (e.g. 3) of taps in comparison to the one hundred and twenty (120) taps in the linear echo canceller 34.

The signals at the taps in the non-linear echo canceller 42 are simultaneously introduced to the adder or summing device 40 to eliminate further any of the signals echoed or reflected from the transmitter 20. The output from the adder or summing device 40 is introduced to the taps in the non-linear echo canceller 42 to adjust the coefficients at the taps in such canceller. This provides for an optimal operation of the non-linear echo canceller 42 in removing at each instant the echoes or reflections received at the receiver 22 from the transmitter 20.

Since the non-linear echo canceller 42 illustratively operates with only three (3) adjustable coefficients as against illustratively one hundred and twenty (120) adjustable coefficients for the linear echo canceller 34, the non-linear echo canceller provides a further significant reduction in the echo signals passing through the telephone lines 14 from the transmitter 20 to the receiver 22. It complements the operation of the linear echo canceller by significantly reducing echo signal components that are non-linear in nature and thus are not capable of being eliminated by the echo canceller 34.

The echo canceller 42 may be constructed in a manner similar to that of the echo canceller 34. However, the use of a non-linear echo canceller such as the canceller 42 is not believed to be known in the prior art for providing an additional significant reduction of the echo signals in the lines 14. The echo canceller disclosed and claimed in the application of Daniel L. Essig may also be used as the non-linear echo canceller 42 to provide enhanced results in eliminating echoes in the copper lines 14.

The digital signals from the adder or summing device 40 pass to a gain control stage 46 in an equalizer which is shown in broken lines and which is generally indicated at 48 in FIG. 3. The gain control stage 46 adjusts the gain of the digital signals from the adder or summing device 40 to a particular level. The gain control stage 46 has a plurality of taps each with an individual coefficient. These coefficients are continuously adjusted by the output signals from an adder or summing device 50. The operation of the adder or summing device 50 will be described in detail subsequently. A gain control stage with adjustable coefficients corresponding to the gain control stage 46 may be known in the prior art.

The output from the gain control stage 46 is introduced to a feed forward equalizer 50 in the equalizer 48. The feed forward equalizer 50 may be known in the prior art. It operates on the digital signals from the gain control stage 46 to eliminate the effects on each such pairs of delays from previous pairs of the digital signals in the signals received by the receiver 22. This is accomplished by providing feedbacks from the adder or summing device 50 to the feed forward equalizer 52 to adjust the coefficients at the individual ones of the plurality of taps in this equalizer.

The adjusted signals from the feed forward equalizer 52 pass to an adder or summing device 54 in the equalizer 48 as do the signals in a decision feedback equalizer 56 which is also in the equalizer 48. The decision feedback analyzer 56 may be known in the prior art. The decision feedback analyzer 56 receives from a multiplexer 58 the digital signals representing the data received by the receiver 22. The digital signals from the multiplexer 58 adjust a plurality of coefficients in the decision feedback equalizer 56 in accordance with the characteristics of these signals. The decision feedback analyzer 56 eliminates any tails on the digital signals passing through the copper lines 14 to the receiver 22 to represent data. These tails result from the differences in the responses of the copper lines to different frequencies in the digital signals representing the data.

An adder or summing device 60 receives the signals from the adder or summing device 54. The adder or summing device 60 and the multiplexer 58 are included in a detector generally indicated in broken lines at 61. The adder 60 receives digital signals from an error predictor 62 which may be known in the art and which is included in the detector 61. The error predictor 62 includes a noise predictor which operates in a well known manner upon the signals from the multiplexer 58 to eliminate noise. In eliminating such noise, the error predictor 60 converts the noise signals in an unpredictable pattern to error signals which have a predictable pattern. The error predictor 62 includes stages which eliminate the errors in the predictable pattern in such signals. The error predictor 62 has a plurality of taps with adjustable coefficients. The error predictor 62 adjusts the coefficients at these taps in accordance with the characteristics of the signals from an adder or summing device 63. These signals are produced in accordance with a comparison of the signals from the adder or summing device 60 and the multiplexer 58.

In an initial period of a few seconds, the digital signals from the transmitter 20 have a simplified pseudo random code to simplify the ability of the receiver 22 to become synchronized quickly with the operation of the transmitter 20. A synchronization as quickly as possible between the operations of the transmitter 20 and the receiver 22 is desirable so that the receiver 22 will be able to receive data thereafter from the transmitter 20. This is particularly desirable when the synchronization occurs after an interruption in the coupling through the copper lines 14 between the transmitter 20 and the receiver 22 because data cannot be transmitted between the transmitter and the receiver until such synchronization occurs. As will be appreciated, only a few seconds of difference in the synchronization between the transmitter 20 and the receiver 22 is important since the ability to transmit important data is lost during the period of non-synchronization.

The simplified pseudo random code in the transmitter 20 is provided by a pattern of signals at analog values of only +3 and −3. By providing analog values of only +3 and −3, the time for synchronizing the operations of the transmitter 20 and the receiver 22 should be minimized. The pairs of the digital signals in the simplified pseudo random code are transmitted for a period as long as seven (7) seconds but the synchronization generally occurs well before the end of this period.

Figure 4:
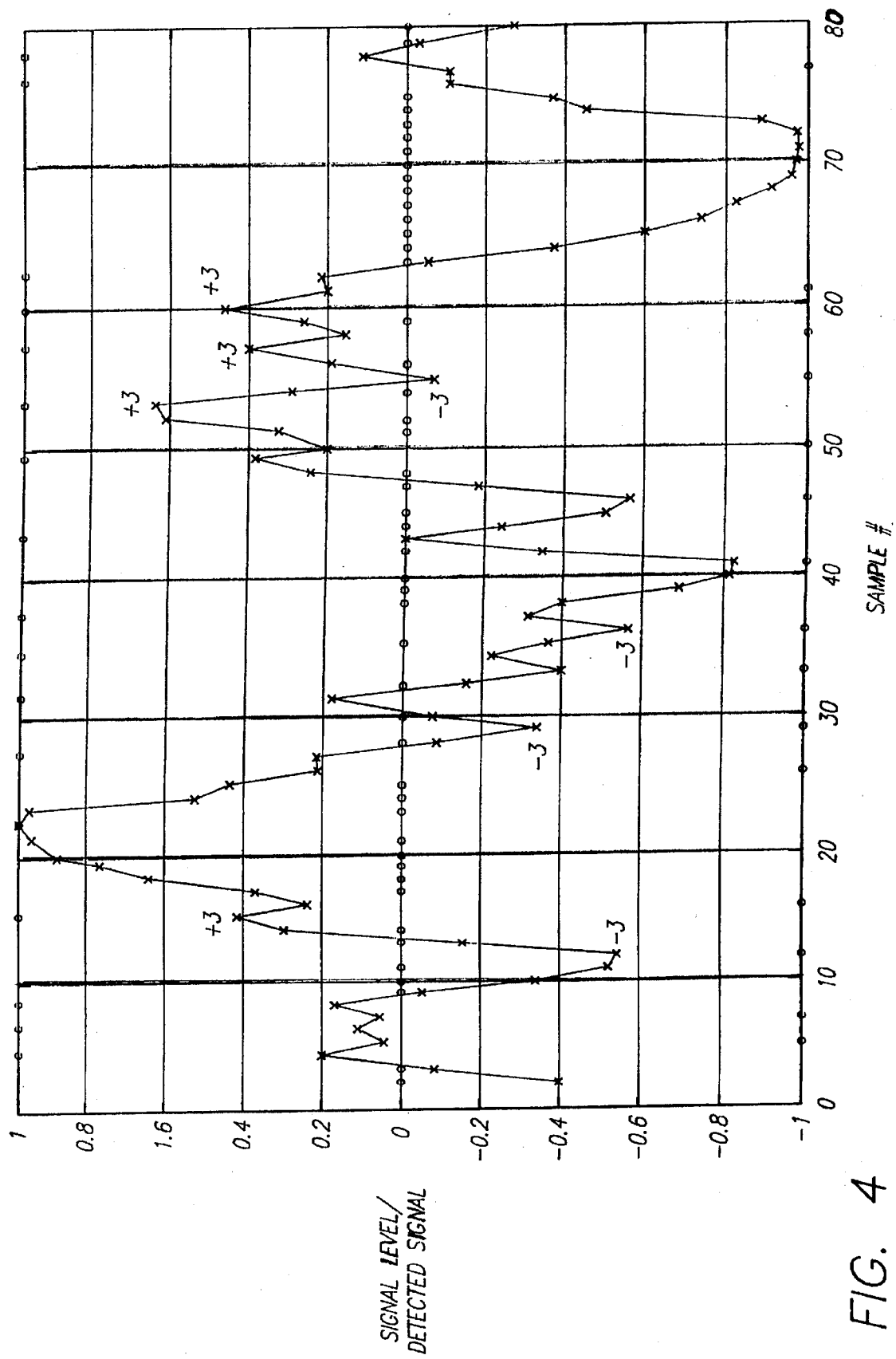
FIG. 4 illustrates a sequence of signals produced at progressive instants of time at one of the stages shown in FIG. 3.

The digital signals in the simplified pseudo random code are introduced from the adder 40 to a peak detector 66 which may be known in the prior art. The peak detector 66 is included in the detector 61. The peak detector 66 operates upon the signals from the adder 40 to detect positive and negative peaks in the patterns of these signals. Positive peaks indicate an analog value of +3 and negative peaks indicate an analog value of −3. The operation of the peak detector 66 may illustratively be seen from FIG. 4 which illustrates digital signals introduced from the adder 40 to the peak detector 66. As shown in FIG. 4, some of the positive peaks are illustratively designated in FIG. 4 as "+3". Similarly, some of the negative peaks are illustratively designated in FIG. 4 as "−3". The signals detected by the peak detector 66 to indicate analog values of +3 and −3 are introduced to a multiplexer 70 in FIG. 1. The multiplexer 70 is included in the detector 61.

The multiplexer 70 also receives digital signals from a slicer 72 which is included in the detector 61. A slicer such as the slicer 72 may be known in the prior art. During the transmission of the pairs of signals with the simplified pseudo random code, the slicer 72 determines whether the digital value of each pair of digital signals from the adder or summing device 60 is closer to an analog value of +3 or to an analog value of −3. When the digital value of a pair of digital signals is closer to an analog value of +3 than to an analog value of −3, the slicer provides the pair of digital signals with a value of +3. Similarly, the slicer 72 provides the pair of digital signals with a value of −3 when the digital signals in the pair indicate an analog value closer to −3 than to +3.

As previously described, the multiplexer 70 receives the digital signals from the peak detector 66 and from the slicer 72. The multiplexer 70 ordinarily provides a higher priority to the peak detector 66 than to the slicer 72. In other words, the multiplexer 70 passes the signals from the peak detector 66 when it simultaneously receives signals from the peak detector and the slicer. It will be appreciated that the multiplexer 70 may provide priority to the signals from the slicer 72 rather than to the signals from the peak detector 66. The signals passing through the multiplexer 70 are introduced to a scrambler-descrambler generally indicated at 74 in FIG. 1. The scrambler-descrambler 74 is included in the detector 61. The scrambler-descrambler constitutes one of the key features of this invention.

The scrambler-descrambler 74 receives a particular number (e.g. 23) of the successive pairs of the digital signals from the multiplexer 70 and generates a sequence of successive digital signals from such particular number of the digital signals from the multiplexer. The sequence of such signals is dependent upon an algorithm corresponding to the algorithm for the simplified pseudo random code transmitted from the transmitter 20 during the initial period of synchronism of the transmitter and the receiver.

The sequence of such signals from the scrambler-descrambler 74 is compared in the adder 50 with the sequence of the signals from the multiplexer 70. This comparison continues until a particular percentage (e.g. 90%) of the signals from the scrambler-descrambler 74 and from the multiplexer 70 coincide. When this occurs, the system is considered to be in synchronization and the comparison of the signals from the scrambler-descrambler 74 and the multiplexer 70 is discontinued. The signals from the multiplexer 70 are then introduced through the multiplexer 58 to the adder 50 for comparison with the signals from the adder 54. The signals from the multiplexer 70 are also introduced through the multiplexer 58 to the gain control stage 46 and the feed forward equalizer 52 to adjust the operation of these stages.

The stage 74 also constitutes a descrambler. After the initial period when the stage 74 operates as a scrambler as described above to synchronize the operation of the transmitter and the receiver 22, the stage 74 operates as a descrambler of the signals from the multiplexer 70. In operating as a descrambler, the stage 74 removes the pseudo random code in the pairs of the digital signals representing the data from the transmitter 20 so that the digital signals passing to output lines 78 represent only the data. The signals on the output lines 78 are introduced to a channel unit interface 80 and from the interface 80 to a decoder 82 for recovering the data in the digital signals passing through the telephone lines 14.

Figure 5:
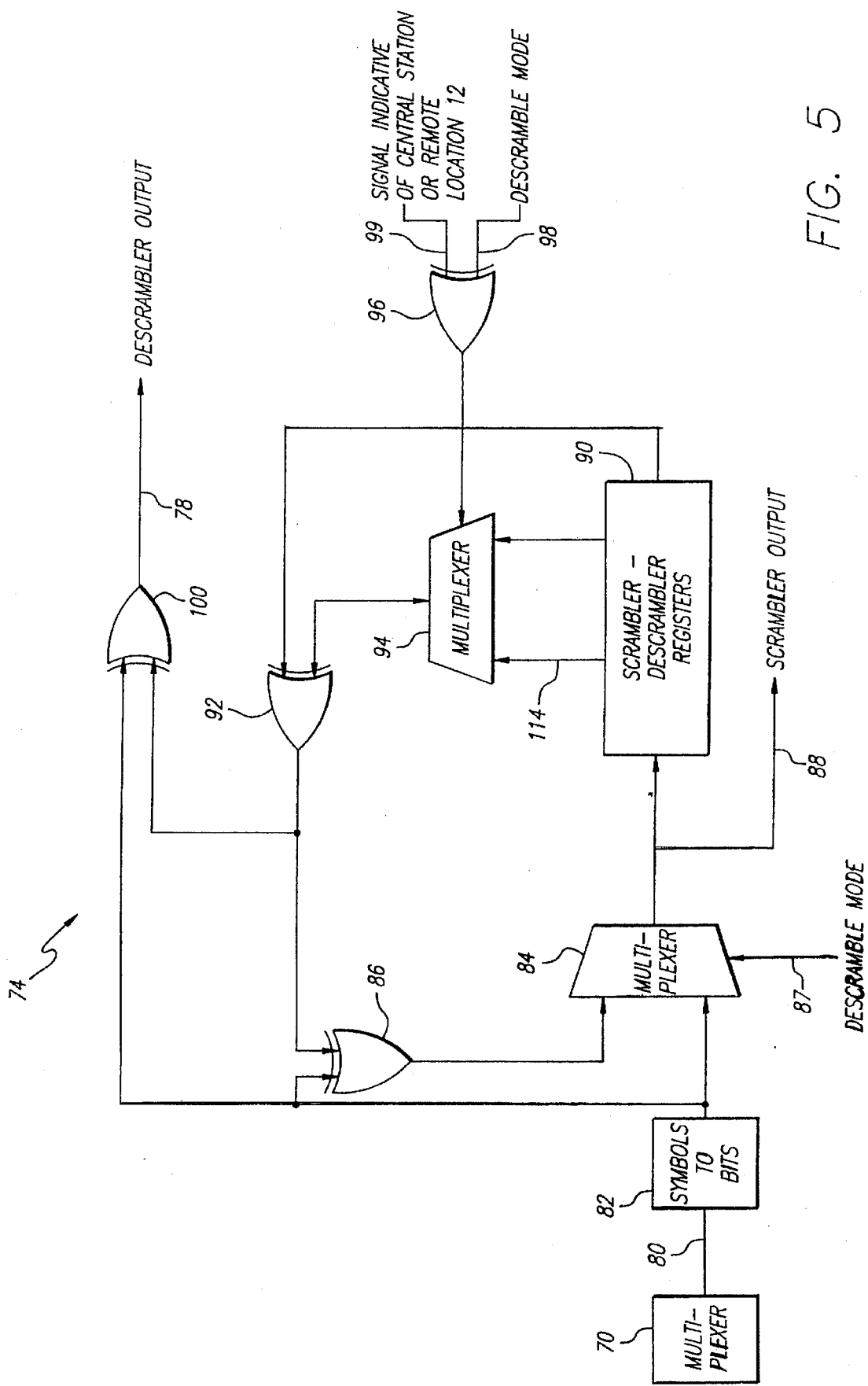
FIG. 5 is a somewhat detailed circuit diagram in block form of another of the stages shown in FIG. 3 when the stage is used as a scrambler or is used as a descrambler.

An embodiment of the scrambler-descrambler 74 is shown in FIG. 5 and is considered to be one of the novel features of this invention. The scrambler-descrambler 74 includes lines 80 which receive the output from the multiplexer 70 (also shown in FIG. 1). The signals on the lines 80 are introduced to a stage 82 which converts parallel inputs for each pair of signals representing an analog value (+3,+1,−1,−3) to serial inputs of such signals. The output from the stage 82 is introduced to an input terminal of a multiplexer 84 having another input terminal connected to the output of an exclusive OR network 86. The multiplexer 84 also receives a control signal on a line 87 when the multiplexer is to operate in the descramble mode.

The output from the multiplexer 84 is introduced to a line 88 when the system shown in FIG. 5 is operating in the scrambler mode. In this mode, the signals on the line 88 constitute the output of the scrambler. The output from the multiplexer 84 also passes to scrambler-descrambler registers 90 when the system shown in FIG. 5 is operating either as a scrambler or a descrambler. The scrambler-descrambler registers 90 operate as specialized shift registers, different embodiments of which are shown in FIGS. 6–9 and described in detail subsequently.

The scrambler-descrambler registers 90 include a plurality (e.g. 23) of flip-flops connected in a sequence. The output from the last flip-flop (e.g. flip-flop 23) is introduced to an exclusive OR network 92. The exclusive OR network 92 also receives the output from a multiplexer 94. The multiplexer 94 has two (2) inputs, one from the output of the fifth (5th) flip-flop in the scrambler-descrambler registers 90 and the other from the output of the eighteenth (18th) flip-flop in the scrambler-descrambler registers. As will be seen from the subsequent discussion, one of the outputs from the scrambler-descrambler registers 90 is effective with the operation of the registers at the central station 10 and the other output is effective with the operation of the registers at the remote location.

The multiplexer 94 also receives on a control line the output from an exclusive OR network 96. An input is provided to the exclusive OR network 96 from a line 98 which controls the operation in a descramble mode of the system shown in FIG. 5. Another input to the exclusive OR network 96 receives the signals through a line 99 from a particular one of the shift register networks shown in FIGS. 8 and 9 depending upon whether the system shown in FIG. 5 is at the central station 10 or at the subscriber location 12.

The output of the exclusive OR network 92 is common with one input terminal of an exclusive OR network 100. A second input terminal of the exclusive OR network 100 and a second input terminal of the exclusive OR network 86 receive the output signals from the stage 82. The output from the exclusive OR network 100 is introduced to the line 78 (also shown in FIG. 1) when the system shown in FIG. 5 is operating as a descrambler.

FIGS. 6 and 7 respectively indicate how the pseudo random code is generated at the transmitter 20. The system shown in FIG. 6 generates the pseudo random code at the transmitter 20 when the transmitter is at the subscriber location 12 and the receiver 22 is at the central station 10. Conversely, the system shown in FIG. 7 generates the pseudo random code at the transmitter 20 when the transmitter is at the central station 10 and the receiver 22 is at the subscriber location 12.

The system shown in FIG. 6 includes a plurality of flip-flops which may be respectively designated as 102a, 102b ... 102n. The output of each flip-flop in the sequence is connected to the input of the next flip-flop in the sequence. In the system shown in FIG. 6, the flip-flop 102n is illustratively the twenty third (23rd) flip-flop in the sequence. The output of this flip-flop is introduced to an adder or summing device 104 as is the output illustratively from the eighteenth (18th) flip-flop in the sequence. The resultant output from the adder or summing device 104 is introduced to an adder or summing device 106 as is the input on a line 108. The output from the adder or summing device 106 in turn passes to an input line 110 which is connected to the input of the first flip-flop in the sequence.

As previously described, the system shown in FIG. 6 generates a pseudo random code at the central station when the transmitter 20 is at the subscriber location 12 and the receiver 22 is at the central station 10. The system shown in FIG. 7 is the same as the system shown in FIG. 6 except that the output of the fifth (5th) flip-flop in the sequence is illustratively connected to an adder or summing device 112 corresponding to the adder or summing device 104 in FIG. 6. The system shown in FIG. 7 generates a pseudo random code when the transmitter 20 is at the central station 10 and the receiver 22 is at the subscriber location.

The arrangements shown in FIGS. 6 and 7 and described above are well known in the art. They generate pseudo random codes by mixing the outputs of disparate pairs of flip-flops in the sequence. For example, the outputs of the eighteenth (18th) and twenty third (23rd) flip-flops in the sequence are mixed in the adder 104 in FIG. 6 and the output of the adder or summing device 104 and the signals on the line 108 are mixed in the adder 106. The signals generated are pseudo random because they are relatively long but they can be predicted (but with some difficulty because of the length of the sequence) from values in the twenty three (23) flip-flops.

The arrangement shown in FIG. 6 produces in a pseudo random code signals which are introduced to the modulating stage 23 in the transmitter 22 of FIG. 3 when the transmitter is at the subscriber location 12. These signals modulate the data signals from the stage 23 in FIG. 2. The resultant signals are filtered in FIG. 2 and converted to analog form. The stages shown in FIG. 3 and described above recover these signals in the pseudo random code and introduce these signals to the multiplexer 70 common to FIGS. 3 and 5. The multiplexer 70 then passes these signals to the scrambler-descrambler registers 90.

FIGS. 8 and 9 illustrate the construction of the scrambler-descrambler registers 90 in FIG. 5 when the registers are at the receiver 22. The embodiment shown in FIG. 8 is operative in the receiver 22 in the central station 10 when the embodiment shown in FIG. 6 is transmitting signals in the pseudo random code from the subscriber location 12. As will be seen, the embodiment shown in FIG. 8 introduces the output from the eighteenth (18th) flip-flop to an adder or summing device 116 just as the output from the eighteenth (18th) flip-flop in FIG. 6 is introduced to the adder or summing device 104 in FIG. 6. In FIG. 8, the input is introduced through a line 117 to a flip-flop 118a constituting the first of the successive flip-flops in the shift register. The input on the line 117 and the output from the adder 116 are also introduced to an adder or summing device 120. The output from the adder 120 passes to a line 121. This is opposite to the input and output in the system shown in FIG. 6.

In like manner, the system shown in FIG. 9 is used in the receiver 22 at the subscriber location 12 when the transmitter 20 sends signals from the central station 10 to the subscriber location 12. The system shown in FIG. 9 introduces the output of the fifth (5th) flip-flop to an adder or summing device 122. This corresponds to the introduction of the output of the fifth (5th) flip-flop to the adder or summing device 112 in FIG. 7. The output from the adder or summing device 122 passes to an adder or summing device 124 as does the input on a line 126. The input on the line 126 also passes to a flip-flop 128 which constitutes the first flip-flop in a sequence. The output from the adder 124 passes to a line 130.

As shown in FIG. 5, either the output from the fifth (5th) flip-flop or the eighteenth (18th) flip-flop in the register 90 passes through the multiplexer 94 depending upon whether the scrambler-descrambler is in the receiver 22 at the central station 10 or at the subscriber location 12. The signals from the multiplexer 94 in turn pass to the exclusive OR network 92 as do the signals from the output (the 23rd flip-flop) of the registers 90. The signals from the multiplexer 94 and from the twenty third (23rd) flip-flop in the register 90 are compared in the exclusive OR network 92 such that, when one (1) (but not both) of the input signals to the multiplexer is a binary "1", a signal passes through the exclusive OR network 92 to the exclusive "OR" network 86.

The exclusive OR network 86 in turn operates on the signals from the exclusive OR network 92 and the signals from the stage 86 to pass signals to the multiplexer 84. The multiplexer 84 provides a priority in the signals from the exclusive OR network 86 over the signals from the stage 82 when the scrambler-descrambler is operating in the scrambler mode. The signals passing through the multiplexer 84 are introduced to the registers 90 after the registers 90 have received the first twenty three (23) signals from the stage 82. In this way, the registers 90 generate a code, after the first twenty three (23) signals passing through the multiplexer 70, dependent upon the characteristics from the exclusive OR network 86. The signals from the multiplexer 86 also pass to the line 88 when the scrambler-descrambler is operating as a scrambler. The signals on the line 88 pass to the multiplexer 58 (FIG. 3) which also receives the signals from the multiplexer 70. The user has an option of determining whether to grant a priority to the passage through the multiplexer 58 of the signals on the line 88 or the signals from the multiplexer 70. As previously described, the signals from the multiplexer 58 are introduced to the adder or summing device 50 for comparison with the signals from the adder or summing device 54. The resultant signals from the adder or summing device 50 adjust the coefficients at the taps in the stages 46 and 52.

After the initial period where the signals in the simplified pseudo random code (only +3, −3) pass from the transmitter 20 to the receiver 22, signals representing data are transmitted from the transmitter to the receiver. At the receiver 22, the digital signals passing through the line 80 for the successive analog values are converted by the stage 82 from a parallel representation to a series representation. The signals then pass through the multiplexer 84, which is conditioned by the signals on the line 87 to provide a priority to the signals from the stage 82 over the signals from the exclusive OR network 86.

Depending upon whether the receiver 22 is at the central station 10 or the subscriber location 12, signals pass from the registers 90 at either the output of the fifth (5th) or eighteenth (18th) flip-flops from the registers. The passage of signals through the multiplexer 94 occurs as a result of the passage through the line 98 and the exclusive OR network 92 of a signal indicating the operation in the descramble mode of the system shown in FIG. 5.

The signals passing through the multiplexer 94 are combined with the signals from the last (the 23rd) flip-flop from the registers 90. The resultant signals then pass to the exclusive OR network 100 which also receives the signals from the stage 82. The output from the exclusive OR network 100 then passes to the output line 78 as the digital indications of the data from the transmitter 20. The output from the exclusive OR network 100 also passes to the adder or summing device 50 in FIG. 3 for comparison with the output from the adder or summing device 54 as described above.

The system and method described above have certain important advantages. They assure that the echo signals at the receiver 22 are efficiently removed. This is particularly significant when it is considered that the echo signals at the receiver may often have a strength at least five hundred percent (500%) greater than the signals passing through the lines 14 to represent data. This efficient cancellation of the echo signals is provided on a first basis as by the linear echo canceller 34 and the adder or summing device in FIG. 3 and on a further basis as by the non-linear echo canceller 44 and the adder or summing device 40 in FIG. 3.

The system and method described above has another important advantage. This results from the inclusion of the scrambler-descrambler stage shown in block form in FIG. 3 and on a detailed basis in FIG. 5 initially in providing a synchronous operation between the transmitter 20 and the receiver 22 in a minimal period of time. The synchronization between the transmitter 20 and the receiver 22 is facilitated by providing the pseudo random code in a minimal number (+3,−3) of analog values.

There are other advantages to the system and method described above. For example, most of the same stages in FIG. 5 are common to the operation of the operation of the scrambler-descrambler stage 74 as a scrambler in initially synchronizing the operation of the transmitter 20 and the receiver 22 or as a descrambler in reproducing the data represented by the digital signals passing through the copper lines 14 from the transmitter 20 to the receiver 22.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. In combination for transmitting from a transmitter and receiving at a receiver through telephone lines data represented by successive digital signals indicating analog levels in a plurality as increments of data, first means for modulating the successive digital signals with digital signals in a pseudo random code, second means responsive to the digital signals from the first means for converting such digital signals to corresponding analog signals and for introducing the analog signals into the telephone lines for transmission through the telephone lines, third means responsive to the analog signals passing through the telephone lines for converting such analog signals to corresponding digital signals, a linear echo canceller having a first plurality of adjustable coefficients, fourth means, including the linear echo canceller, responsive to the digital signals from the third means and the digital signals in the pseudo random code, adjusted in accordance with the adjustable coefficients in the first plurality, for comparing such digital signals to cancel the digital signals transmitted from the receiver to the transmitter and reflected from the transmitter back to the receiver to obtain resultant digital signals and for adjusting the coefficients in the first plurality in the linear echo canceller in accordance with the results of such comparison, a non-linear echo canceller having a second plurality of adjustable coefficients, fifth means, including the non-linear echo canceller, responsive to the resultant digital signals from the fourth means and the digital signals in the pseudo random code, adjusted in accordance with the adjustable coefficients in the second plurality, for comparing such digital signals to provide an enhanced approximation of the digital signals representing the data and for adjusting the coefficients in the second plurality in accordance with the results of such comparison, and sixth means responsive to the digital signals from the fifth means for processing such digital signals to recover the digital signals representing the data.

2. In a combination as set forth in claim 1, the sixth means including seventh means responsive to the digital signals from the fifth means for removing from, such digital signals in representation of the enhanced approximation of the data, the effects of any previous digital signals received by the fifth means and including eighth means responsive to the digital signals from the seventh means for removing from the leading edges of such digital signals any tails in such digital signals.

3. In a combination as set forth in claim 1, seventh means responsive to the digital signals from the sixth means for decoding such digital signals to recover the data.

4. In a combination as set forth in claim 1, seventh means for initially transmitting digital signals in a simplified pseudo random code involving only a minimal number of the analog values in the plurality and eighth means responsive to the digital signals from the seventh means for processing such digital signals to obtain subsequent operation of the fourth, fifth and the sixth means in a synchronized relationship with the transmission from the transmitter to the receiver of the analog signals representing data.

5. In a combination as set forth in claim 2, eighth means for providing digital signals in a simplified pseudo random code involving only a minimum number of the analog levels, ninth means responsive to the digital signals from the third means and the eighth means for initially synchronizing such digital signals to obtain subsequent operation of the fourth, fifth and sixth means in a synchronized relationship for the transmission from the transmitter to the receiver of the analog signals representing data.

6. In combination for initially synchronizing transmission through telephone lines of data represented by successive digital signals from a transmitter and reception at a receiver of such data where the digital signals indicate particular ones of analog levels in a plurality as increments of data, first means at the transmitter for initially providing successive digital signals having a pseudo random code and representing only a limited number of the analog levels in the plurality, second means responsive at the transmitter to the successive digital signals from the first means for converting such signals to corresponding analog signals for transmission through the telephone lines, third means responsive at the receiver to the analog signals transmitted through the telephone lines for converting such analog signals to corresponding digital signals, fourth means responsive to a limited number of the digital signal from the third means at the receiver for providing the successive digital signals having the pseudo random pattern, fifth means responsive at the receiver to a limited number of the digital signals from the third means for generating a sequence of digital signals in the pseudo random code with the limited number of analog levels in the plurality, and sixth means responsive to the signals from the third means and the fifth means for processing such signals to synchronize operation of the receiver with operation of the transmitter.

7. In a combination as set forth in claim 6, seventh means responsive at the receiver to the digital signals from the third means for detecting peaks in such digital signals to distinguish between the limited number of the analog levels in the pseudo random pattern, and eighth means responsive at the receiver to the digital signals from the fifth and seventh means for activating, on a selective priority basis, individual ones of the digital signals from the fifth and seventh means to obtain the digital signals for introduction to the sixth means for processing by the sixth means with the digital signals from the third means.

8. In a combination as set forth in claim 6, seventh means for transmitting, after the synchronization of the transmitter and the receiver, the digital signals representing the data and modulated in a pseudo random code with all of the analog levels in the plurality, the fifth means being operative at the receiver after the synchronization of the transmitter and the receiver for generating a sequence of the digital signals in the pseudo random code with all of the analog levels in the plurality, and the sixth means being responsive, after the synchronization of the transmitter and the receiver, to the signals from the third and fifth means to recover the digital signals transmitted in representation of the data.

9. In a combination as set forth in claim 6, the fifth means having a first mode of operation during the synchronization of the transmitter and the receiver and having a second mode of operation after the synchronization of the transmitter and the receiver.

10. In combination at a receiver for receiving through telephone lines from a transmitter analog signals corresponding to digital signals representing data in accordance with individual ones of a plurality of analog levels, the digital signals being modulated in accordance with digital signals in a first pseudo random code, the receiver also receiving digital signals modulated in a second pseudo random code different from the first pseudo random code and transmitted from the receiver to the transmitter and reflected from the transmitter back to the receiver, first means for receiving the analog signals passing through the telephone lines, second means responsive to the analog signals from the first means for converting such analog signals to corresponding digital signals, third means for providing the digital signals in the second pseudo random code, a linear echo canceller having a first plurality of coefficients, the linear echo canceller being responsive to a particular number of the successive digital signals from the third means for modifying such digital signals in accordance with the first plurality of coefficients, fourth means responsive to the digital signals from the second means for modifying such digital signals in accordance with the modified digital signals from the linear echo canceller and for introducing such modified digital signals to the linear echo canceller to obtain modifications in the coefficients in the first plurality in accordance with such modified digital signals, a non-linear echo canceller having a second plurality of coefficients less than the first plurality, the non-linear echo canceller being responsive to the digital signals in the pseudo random code from the third means for modifying such digital signals in accordance with the coefficients in the second plurality, and fifth means responsive to the digital signals from the fourth means for modifying such digital signals in accordance with the modified digital signals from the non-linear echo canceller and for introducing such modified digital signals to the non-linear echo canceller to obtain modifications in the coefficients in the second plurality in accordance with such modified digital signals.

11. In a combination as set forth in claim 10, sixth means responsive to the modified digital signals from the fifth means for recovering the digital signals representing the data.

12. In a combination as set forth in claim 10, sixth means responsive to the modified digital signals from the fifth means for eliminating, from each of such modified digital signals, the effects of the leading edges of previous ones of such modified digital signals, and seventh means responsive to the modified digital signals from the fifth means for operating upon the trailing edge of each individual one of such modified digital signals to eliminate the effects of any tail in such individual one of such modified digital signals upon successive ones of such modified digital signals.

13. In a combination as set forth in claim 10 wherein the data has a plurality of different analog levels and the digital signals transmitted from the transmitter to the receiver through the telephone lines represent the plurality of different analog levels and wherein digital signals representing a minimal number of analog levels are initially transmitted through the telephone lines before the transmission of the digital signals representing the data and wherein the third means initially provide the digital signals representing the minimal number of analog levels and wherein means are responsive to the digital signals initially received at the receiver in representation of the minimal number of analog levels for synchronizing operation of the third means and the analog signals received by the first means through the telephone lines.

14. In combination at a receiver for receiving through telephone lines from a transmitter an analog signal corresponding to digital signals representing data in accordance with individual ones of a plurality of analog levels, the digital signals being initially modulated in accordance with digital signals in a first pseudo random code in representation of a minimal number of analog levels for facilitating a synchronization in operation of the receiver with the digital signals subsequently passing through the telephone lines to represent data, the receiver also receiving signals transmitted from the receiver to the transmitter and reflected by the transmitter to the receiver and modulated in a second pseudo random code different from the first pseudo random code, first means responsive to the analog signal for converting such analog signal to digital signals in the first pseudo random code, second means for providing the digital signals in the second pseudo random code with the minimal number of analog levels, third means responsive to the digital signals from the first and second means for operating upon such signals to facilitate the recovery of the digital signals corresponding to the analog signal initially transmitted through the telephone lines with the first pseudo random code, fourth means responsive to the digital signals from the third means for detecting the peaks of such digital signals to provide a first approximation of the digital signals in the first pseudo random code with the minimal number of analog levels, fifth means responsive to the digital signals from the third means for operating upon such digital signals to provide the digital signals corresponding to the individual one of the minimal number of analog levels closest to the analog level of the digital signals from the third means, sixth means responsive to the digital signals from the fourth and fifth means for selectively passing individual ones of such digital signals, seventh means responsive to a limited sequence of the digital signals from the sixth means for producing an extended sequence of digital signals in the pseudo random code representative of the minimal number of analog levels, and eighth means responsive to the signals from a selective one of the sixth and seventh means and to the signals from the third means for indicating when operation of the receiver is synchronized with the digital signals transmitted to the receiver in the first pseudo random code.

15. In a combination as set forth in claim 14, ninth means responsive to the signals from the eighth means for initiating the transmission through the telephone lines to the receiver of the data represented by the successive digital signals indicative of the analog levels in the plurality.

16. In a combination as set forth in claim 14, tenth means responsive to the digital signals from the third means for removing from each individual one of such digital signals the effects of previous ones of such digital signals on the leading edge of such individual one of the digital signals before such individual one of such digital signals is introduced to the fourth and fifth means, and eleventh means responsive to the digital signals from the third means for removing the effect on subsequent ones of such digital signals of any tail on such individual one of the digital signals before such individual one of such digital signals is introduced to the fourth and fifth means.

17. In a combination as set forth in claim 14, the first means being operative to receive the digital signals representing data and indicative of the analog levels in the plurality and modulated in the second pseudo random code, the second means being operative to provide the digital signals in the second pseudo random code of all of the analog levels in the plurality, and the third means including an echo canceller responsive to the digital signals from the first means for canceling from such digital signals the digital signals transmitted from the receiver to the transmitter and reflected by the transmitter back to the receiver and modulated in the second pseudo random code.

18. In combination at a receiver for receiving through telephone lines from a transmitter an analog signal corresponding to digital signals representing data in accordance with individual ones of a plurality of analog levels, the digital signals being modulated in accordance with digital signals in a first pseudo random code, first means responsive to the analog signal passing through the telephone lines in representation of the data for producing digital signals corresponding to the analog signal, second means for providing digital signals in a second pseudo random code different from the first pseudo random code, the second pseudo random code constituting the code modulating analog signals transmitted from the receiver to the transmitter and reflected by the transmitter back to the receiver, third means responsive to the digital signals from the first and second means for providing at least a partial elimination in the digital signals from the first means of the digital signals modulated in the second pseudo random code and transmitted to the transmitter from the receiver and reflected by the transmitter back to the receiver, fourth means responsive to the digital signals from the second and third means for providing a further elimination, in the digital signals from the third means, of the digital signals modulated in the second pseudo random code and transmitted to the transmitter from the receiver and reflected by the transmitter back to the receiver, and fifth means responsive to the digital signals from the fourth means for recovering the signals representing the data from such signals.

19. In a combination as set forth in claim 18, the third means including sixth means responsive to a first particular number of the successive digital signals from the first and second means for comparing such digital signals to provide the at least partial elimination, in the digital signals from the first means, of the digital signals modulated in the second pseudo random code and transmitted from the receiver to the transmitter and reflected by the transmitter back to the receiver, and the fourth means including seventh means responsive to a second particular number of the successive digital signals from the second and third means for comparing such digital signals to provide the further elimination, in the digital signals from the third means, of the digital signals modulated in the second pseudo random code and transmitted from the receiver to the transmitter and reflected by the transmitter back to the receiver, the second particular number being less than the first particular number.

20. In a combination as set forth in claim 18, the fifth means including sixth means responsive to the digital signals from the fourth means for operating upon such digital signals to determine the particular one of the analog levels closest in the plurality to the pattern represented by each of the digital signals from the fourth means and for converting such digital signals to the pattern representative of such closest analog level.

21. In a combination as set forth in claim 18, the fifth means including sixth means responsive to the digital signals from the fourth means for operating upon such digital signals to eliminate noise in such digital signals by predicting any error resulting from such noise and then eliminating such error.

22. In a combination as set forth in claim 18, the fifth means including sixth means responsive to the digital signals from the fourth means for eliminating from the leading edge of each individual one of such digital signals the effects of any delays in the digital signals provided by the fourth means prior to such individual one of such digital signals.

23. In a combination as set forth in claim 18, the third means including a first echo canceller with a first plurality of terminals each having an individual coefficient and each providing an adjustment in the digital signals in the second pseudo random code from the second means in accordance with such individual coefficient, the third means including sixth means responsive to the signals from the second means and the first echo canceller to provide adjustments in the coefficients at the first plurality of terminals in the first echo canceller, the fourth means including a second echo canceller with a second plurality of terminals each having an individual coefficient and each providing an adjustment in the digital signals in the second pseudo random code from the second means in accordance with such individual coefficient, the fourth means including seventh means responsive to the signals from the sixth means and the second echo canceller to provide adjustments in the coefficients at the second plurality of terminals in the second echo canceller, the second plurality of terminals being less than the first plurality of terminals.

24. In combination at a receiver for receiving through telephone lines from a transmitter analog signals corresponding to digital signals representing data in accordance with individual ones of a plurality of analog levels, the digital signals being initially modulated in accordance with digital signals in a pseudo random code having a minimal number of the analog levels, first means for receiving the analog signals passing through the telephone lines and modulated in the pseudo random code, second means responsive to the received analog signals for converting such analog signals to corresponding digital signals, third means responsive to a limited number of the digital signals from the second means for generating a pseudo random code corresponding to the pseudo random code at the transmitter, fourth means responsive to the signals from the second and third means for synchronizing operation of the receiver with operation of the transmitter, the pseudo random code constituting a first pseudo random code, the digital signals received by the receiver including digital signals in a second pseudo random code different from the first pseudo random code, the digital signals in the second pseudo random code being transmitted from the receiver to the transmitter and being reflected from the transmitter back to the receiver, fifth means for generating digital signals in the second pseudo random code, and sixth means responsive to the digital signals from the second and fifth means for eliminating, from the digital signals from the second means, the digital signals modulated in the second pseudo random code and transmitted from the receiver to the transmitter and reflected from the transmitter back to the receiver, the fourth means being responsive to the digital signals from the second and sixth means for synchronizing operation of the receiver with operation of the transmitter.

25. In a combination as set forth in claim 24, seventh means responsive to the digital signals from the sixth means for determining the analog levels closest to the values represented by such digital signals and for providing the digital signals representing such analog levels in substitution for the digital signals from the sixth means, and the fourth means being responsive to the digital signals from the second and seventh means for synchronizing the operation of the receiver with the operation of the transmitter.

26. In a combination as set forth in claim 24, seventh means responsive to the digital signals from the sixth means for determining the peaks in such digital signals and for adjusting the values of the digital signals in accordance with the determination of such peaks, and the fourth means being responsive to the digital signals from the second and seventh means for synchronizing the operation of the receiver with the operation of the transmitter.

27. In a combination at a receiver for receiving through telephone lines from a transmitter analog signals corresponding to digital signals representing data in accordance with individual ones of a plurality of analog levels and modulated in a first pseudo random code involving the analog levels, the digital signals being initially provided in a second pseudo random code representing a minimal number of analog levels for facilitating synchronization of operation of the receiver with operation of the transmitter, first means responsive to the analog signals for converting such analog signals to corresponding digital signals, second means responsive to the digital signals from the first means for eliminating from such digital signals the digital signals previously transmitted from the receiver to the transmitter and reflected by the transmitter back to the receiver, third means at the receiver responsive to the digital signals from the second means for eliminating from each of such digital signals the effects of delays in previous digital signals from the second means, fourth means responsive to the digital signals from the third means for detecting the peaks of such digital signals, fifth means responsive to the digital signals from the third means for converting such digital signals to digital signals representing the analog levels closest in the plurality to the analog values of the digital signals from the third means, sixth means responsive to the digital signals from the fourth and fifth means for prioritizing such digital signals in a particular relationship and for passing such prioritized digital signals, seventh means responsive to the prioritized digital signals passed by the sixth means for generating, during production of the second pseudo random code at the transmitter, signals in a pseudo random code dependent initially upon a limited number of the prioritized digital signals generated in the second pseudo random code by the transmitter and thereafter upon an increased number of the prioritized digital signals in the second pseudo random code generated by the transmitter, and eighth means responsive to the digital signals from the fourth means and the seventh means during the production of the second pseudo random code for synchronizing operation of the receiver with operation of the transmitter.

28. In a combination at a receiver as set forth in claim 27, the seventh means including ninth means for providing a shift register constructed to shift digital signals in sequence through a plurality of successive positions in the shift register and including tenth means responsive to the digital signals from particular positions in the shift register for passing from the shift register, upon each shift of the digital signals in the shift register, the digital signals from such particular positions in the shift register for introduction of such passed digital signals to the shift register.

29. In a combination at a receiver as set forth in claim 28, eleventh means responsive to the digital signals from the sixth means and the seventh means for selectively passing such signals to the eighth means for comparison in the eighth means with the signals from the fourth means.

30. In a combination as set forth in claim 29 wherein the tenth means includes a first exclusive OR network responsive to the digital characteristics of the digital signals from the particular positions in the shift register for producing digital signals in accordance with such digital characteristics and also includes a second exclusive OR network responsive to the digital signals from the sixth means and the first exclusive OR network for producing digital signals for passage to the ninth means.

31. In combination at a receiver for receiving through telephone lines from a transmitter analog signals corresponding to digital signals representing data in accordance with individual ones of a plurality of analog levels and modulated in a first pseudo random code involving the plurality of analog levels, the digital signals being initially provided in a second pseudo random code representing a minimal number of the plurality of analog levels for facilitating synchronization of operation of the receiver with operation of the transmitter, first means responsive to the analog signals for producing digital signals representative of the analog signals, second means responsive to the digital signals from the first means in the second pseudo random code for recovering such digital signals, such code third means having a plurality of successive positions, the third means being responsive to a limited number of the digital signals from the second means for transferring such digital signals progressively to the successive positions in the third means, fourth means responsive to the digital signals shifted to the progressive positions in the third means for tapping such digital signals at particular ones of such progressive positions, fifth means responsive to the tapped digital signals and the digital signals from the second means for operating upon such digital signals in a particular relationship to obtain digital signals for introduction to the third means, and sixth means responsive to the digital signals from the second means and the digital signals from the fifth means for synchronizing the operation of the receiver with the operation of the transmitter.

32. In a combination at a receiver as set forth in claim 31, seventh means responsive to the digital signals from the second means for providing for continuous introduction of such digital signals to the third means during the transfer of the signals representing data from the second means to the third means, and eighth means responsive to the tapped digital signals and the digital signals from the second means for operating upon such digital signals in a particular relationship to obtain digital signals representing the data.

33. In a combination as set forth in claim 32, the sixth means being responsive to the digital signals from the second means in representation of data and the digital signals from the fifth means for comparing such digital signals to produce digital signals for introduction to the third means.

34. In a combination at a receiver as set forth in claim 32, the receiver providing analog signals corresponding to digital signals modulated in a second pseudo random code different from the first pseudo random code and transmitted from the receiver to the transmitter and reflected by the transmitter back to the receiver, ninth means for providing digital signals in the second pseudo random code, tenth means responsive to the digital signals from the second means and the ninth means for eliminating, from the digital signals from the second means, effects of the reflection of the analog signals from the transmitter to the receiver, the signals from the tenth means being introduced to the third means instead of the signals from the second means, and the sixth means being responsive to the digital signals from the tenth means and the digital signals from the fifth means for enhancing production of the digital signals representing the data.

35. In a combination at a receiver as set forth in claim 34, the tenth means including a first echo canceller having a first plurality of terminals, the first echo canceller being responsive to the digital signals in the pseudo random code from the ninth means for providing adjustable coefficients for adjusting the digital signals from the ninth means in accordance with such adjustable coefficients, the first echo canceller being responsive the adjusted digital signals from the ninth means and the digital signals from the second means for eliminating, from the digital signals from the ninth means, effects of the signals reflected from the transmitter to the receiver, the tenth means providing digital signals for adjusting the coefficients at the first plurality of terminals in the first echo canceller, eleventh means including a second echo canceller having a second plurality of terminals, the second echo canceller being responsive to the digital signals in the pseudo random code from the ninth means for providing adjustable coefficients for adjusting the digital signals from the ninth means in accordance with such adjustable coefficients, the second echo canceller being responsive to the adjusted digital signals from the ninth means and the digital signals from the tenth means for eliminating, from the digital signals from the tenth means, effects of the digital signals reflected from the transmitter to the receiver, the eleventh means providing digital signals for adjusting the coefficients at the second plurality of terminals in the second echo canceller, the number of terminals in the second echo canceller being less than the number of terminals in the first echo canceller, the digital signals from the eleventh means being introduced to the third means instead of the digital signals from the second means, the sixth means being responsive to the digital signals from the eleventh means and the digital signals from the fifth means for comparing these digital signals for enhancing production of the digital signals representing the data.

36. In combination at a receiver for receiving through telephone lines from a transmitter analog signals corresponding to digital signals representing data in accordance with individual ones of a plurality of analog levels and modulated in a first pseudo random code involving the plurality of analog levels, first means for receiving the analog signals transmitted from the transmitter and the analog signals transmitted from the receiver to the transmitter and reflected from the transmitter back to the receiver and modulated in a second pseudo random code different from the first pseudo random code, second means responsive to the analog signals received by the first means for converting such analog signals to digital signals representing the analog signals, third means for providing digital signals in the second pseudo random code, fourth means defining a first echo canceller having a first plurality of terminals with first adjustable coefficients, the fourth means being responsive to the digital signals from the third means for adjusting such signals in accordance with such first adjustable coefficients, fifth means responsive to the digital signals from the second means and the fourth means for comparing such digital signals and for adjusting the coefficients at the first plurality terminals in the fourth means in accordance with the results of such comparison, sixth means defining a second echo canceller having a second plurality of terminals, less than the first plurality of terminals, with adjustable coefficients, the sixth means being responsive to the digital signals from the third means for adjusting these digital signals in accordance with such adjustable coefficients, and seventh means responsive to the digital signals from the fifth means and the sixth means for comparing such digital signals to produce resultant signals and for adjusting the coefficients in the sixth means in accordance with such resultant signals.

37. In a combination as set forth in claim 36, eighth means responsive to the resultant digital signals from the seventh means for recovering the digital signals representing the data.

38. In a combination as set forth in claim 36, the digital signals from the transmitter being transmitted in an initial period in a third pseudo random code involving a minimal number of the plurality of analog levels, eighth means responsive to the digital signals in the third pseudo random code from the seventh means in the initial period for processing such digital signals in accordance with such third pseudo random code, and ninth means responsive to the digital signals from the eighth means and the fifth means for synchronizing operation of the receiver with operation of the transmitter.

39. In a combination as set forth in claim 37, ninth means responsive to the digital signals from the eighth means for selectively modifying such digital signals in accordance with peaks defined by successive ones of such digital signals and in accordance with adjustments made in such digital signals and representing an individual one of the plurality of analog levels closest in the plurality to the values represented by the digital signals from the eighth means, and tenth means responsive to the digital signals from the ninth means for recovering the data.

40. In combination as set forth in claim 37, the digital signals from the transmitter being transmitted in an initial period in a third pseudo random code involving a minimal number of the plurality of analog levels, eighth means responsive to the digital signals from the seventh means for selectively modifying such digital signals in accordance with peaks defined by such digital signals and in accordance with adjustments made in such digital signals and representing an individual one of the plurality of analog levels closest in the plurality to the values represented by the digital signals from the eighth means, the digital signals from the transmitter being transmitted in an initial period in the third pseudo random code, ninth means responsive to the digital signals from the eighth means in the initial period for processing such signals in accordance with the third pseudo random code, tenth means responsive to the digital signals from the ninth means for synchronizing operation of the receiver with operation of the transmitter, and eleventh means responsive to the digital signals from the eighth means during the transmission of the digital signals representing data from the transmitter to the receiver for recovering such data.

41. In combination at a receiver for receiving through telephone lines from a transmitter analog signals corresponding to digital signals representing data in accordance with individual ones of a plurality of analog levels, the digital signals being initially modulated in accordance with digital signals in a pseudo random code having a minimal number of analog levels, first means responsive to the analog signals for producing digital signals representing the analog signals, second means including a plurality of registers responsive to a limited number of the digital signals from the first means for generating a sequence of digital signals in the registers in accordance with the pseudo random code, third means responsive to the sequence of signals from the registers for producing resultant digital signals for introduction to the second means, fourth means responsive to the digital signals from the first means and the resultant digital signals from the third means for synchronizing operation of the receiver with operation of the transmitter, fifth means, including the plurality of registers, responsive to the sequence of the digital signals from the first means for passing such digital signals when the receiver is receiving the analog signals representing the data, and sixth means responsive to the sequence of the digital signals from the fifth means for recovering the data when the receiver is receiving the digital signals representing the data.

42. In a combination as set forth in claim 41, seventh means having first and second modes of operation and operative in the first mode to pass initially to the second means the limited number of the digital signals from the first means and then to pass the resultant digital signals from the third means to the second means and operative in the second mode to pass the digital signals from the first means in a continuous sequence to the second means.

43. In a combination as set forth in claim 42, eighth means responsive to the digital signals passing through the seventh means in the first mode of operation for introducing such digital signals to the fourth means for comparison with the digital signals from the first means to synchronize the operation of the receiver with the operation of the transmitter.

44. In a combination as set forth in claim 41, the third means including logical network means responsive to the digital signals from the plurality of registers and to the digital signals from the first means, during production of the pseudo random code with the minimal number of the plurality of analog levels, for generating an increased number of the digital signals, after the limited number of digital signals from the first means, for introduction to the second means, and the sixth means including the logical network means being responsive to the digital signals from the plurality of registers and to the digital signals from the first means for generating the digital signals representing the data when the receiver is receiving the digital signals representing the data.

45. In a combination as set forth in claim 41, the third means and the sixth means including a first exclusive OR network responsive to the digital signals from the plurality of registers for generating output digital signals, the third means also including a second exclusive OR network responsive to the digital signals from the first exclusive OR network and from the first means for generating digital signals for introduction to the second means after the limited number of digital signals from the first means and during production of pseudo random signals with the minimal number of analog levels, and the sixth means including a third exclusive OR network responsive to the digital signals from the first exclusive OR network and from the first means for generating the digital signals representing data when the receiver is receiving the digital signals representing the data.

* * * * *